April 10, 1956   R. WEISS   2,741,169
FILM ADVANCING MECHANISM FOR STEREO ROLL FILM CAMERAS
Filed June 26, 1952   3 Sheets-Sheet 1

INVENTOR,
Richard Weiss
BY Charles Shepard
Attorney

April 10, 1956    R. WEISS    2,741,169
FILM ADVANCING MECHANISM FOR STEREO ROLL FILM CAMERAS
Filed June 26, 1952    3 Sheets-Sheet 2

Richard Weiss
INVENTOR,
BY Charles Shepard
Attorney.

Richard Weiss
INVENTOR,
BY Charles Shepard.
Attorney.

United States Patent Office 2,741,169
Patented Apr. 10, 1956

2,741,169

FILM ADVANCING MECHANISM FOR STEREO ROLL FILM CAMERAS

Richard Weiss, Braunschweig, Germany, assignor to Franke & Heidecke, Fabrik Photographischer Präzisions-Apparate, Braunschweig, Germany, a firm of Germany Application June 26, 1952, Serial No. 295,687

Claims priority, application Germany June 26, 1951

7 Claims. (Cl. 95—18)

This invention relates to mechanism for advancing the film of photographic cameras on the roll film type, by unequal amounts during successive operation of the film advancing mechanism. For example, in certain types of stereoscopic roll film cameras, it is desired to advance the film by one picture length or step, at alternate operations of the advancing means, and by three steps or picture lengths at the intervening operations of the film advancing mechanism. When a stereo camera takes two simultaneous exposures on the film strip, on picture areas which are not contiguous but are spaced from each other by one picture space between them, this advancing of the film strip alternately first through one picture length and then through three picture lengths results in complete use of the film without waste.

An object of the present invention is the provision of improved and more satisfactory film advancing mechanism for advancing the film by different amounts or extents (for example, one step and three steps) upon successive operations of the advancing mechanism.

Another object of the invention is the provision of such film advancing mechanism so designed as to produce reliable and smooth advance of the film, in a positive manner and with relatively low frictional resistance.

A further object is the provision of mechanism of this kind, in a form which can be built simply and inexpensively.

A still further object is the provision of film advancing mechanism which avoids the use of undesirable gears, slip clutches, and the like.

These and other desirable objects may be attained in the manner disclosed as an illustrative embodiment of the invention in the following description and in the accompanying drawings forming a part hereof, in which.

The same reference numerals throughout the several views indicate the same parts.

Let it be assumed that the photographic camera is equipped with a driving shaft connected, for example, to a film advancing crank, and a driven shaft connected to a film sprocket, so arranged that one complete revolution of the driven shaft will advance the film through four steps or picture lengths. If it is desired to turn the film advancing crank through one half revolution or 180 degrees at each operation, it will be seen that the driving shaft and the driven shaft should be connected to each other in such manner that at one operation, a turn of the driving shaft through 180 degrees will serve to turn the driven shaft through only 90 degrees, thus advancing the film through one step or picture length, while the next operation of the driving shaft through 180 degrees will serve to turn the driven shaft through 270 degrees, to advance the film through three steps or picture lengths.

Figure 1:
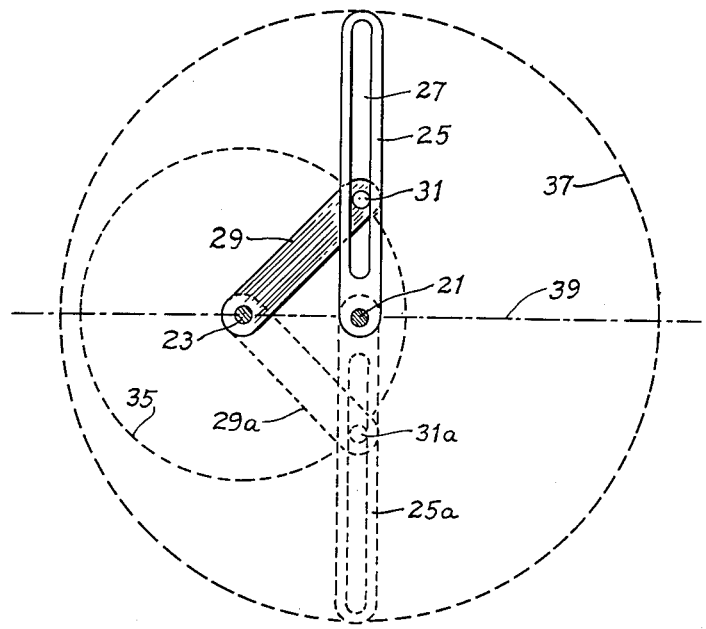
Fig. 1 is a diagrammatic view of film advancing mechanism in accordance with one embodiment of the invention, in which the driving shaft and the driven shaft are offset from each other.

In Fig. 1 there is shown a very simple construction for accomplishing this, whenever the camera construction is such that the driving shaft and the driven shaft may be offset from each other instead of being alined with each other. The driving shaft is here indicated at 21, and the driven shaft at 23, both being viewed in cross section. The driving shaft 21 has fixed to it a long radial crank arm 25 having a long slot 27 extending radially therein. The driven shaft 23 has fixed to it a radial crank arm 29 provided with a fixed crank pin 31 which engages in the slot 27.

The dotted circle 35 indicates the path through which the crank pin 31 swings as the driven shaft 23 turns, while the dotted circle 37 indicates the path through which the end of the crank arm 25 on the driving shaft turns, as the driving shaft turns through a complete circle. The dot dash line 39 indicates a diametrical line drawn through the centers of the two shafts 21 and 23.

If the location of the shaft 21 is properly chosen with respect to the shaft 23 and the circle 35, it is seen that a rotation of the shaft 21 through the first 180 degrees will cause a rotation of the shaft 23 through 90 degrees, and the next rotation of the shaft 21 through 180 degrees will cause rotation of the shaft 23 through 270 degrees, thus accomplishing the desired advance of the film through alternating amounts of one picture length and three picture lengths. With the parts initially in the positions shown in full lines in Fig. 1, a clockwise rotation of the shaft 21 through 180 degrees will bring the crank arm 25 to the dotted line position shown at 25a. This will swing the pin 31 and the crank arm 29 down to the dotted line positions shown at 31a and 29a, which is 90 degrees from the full line position. Then when the shaft 21 swings through the next 180 degrees, still in a clockwise direction, the pin 31 and its arm 29 are carried around in a clockwise direction through 270 degrees, back to the initial starting position shown in full lines.

The same principles apply when it is desired to turn the driven shaft 23 through an angle greater or less than 90 degrees on the first operation of the driving shaft through 180 degrees, and through the remainder of the complete rotation upon the second operation of the driving shaft through 180 degrees. The angle through which the driven shaft is turned can be varied by varying the position at which the driving shaft 21 is placed, relative to the circle 35; in other words, varying the amount by which the driving shaft 21 is offset from the driven shaft 23, for any given radial distance of the pin 31 from the shaft 23. The offset distance from the shaft 23 to the shaft 21 may be designated as $d$, while the radial distance from the shaft 23 to its crank pin 31 may be designated as $r$. The central angle through which the arm 29 is to turn upon each half revolution of the shaft 21 may be designated as $a$. Then it is seen from Fig. 1 that $d$ equals $r \cos \frac{1}{2} a$. In the typical case where $a$ equals 90 degrees, $\frac{1}{2} a$ is 45 degrees and cos 45 degrees is 0.7071. Hence the offsetting of the shaft 21 from the shaft 23 should be a distance of 0.7071 of the radius from the shaft 23 to the pin 31.

In some situations, it may be preferred to have the driving shaft and the driven shaft in axial alinement with each other, instead of having them offset from each other as shown in Fig. 1. When this is desired, the same principles of the invention may be employed, by using an intermediate shaft offset from the alinement of the driving and driven shafts. The motion is then transferred from the driving shaft to the intermediate shaft, and from the intermediate shaft to the driven shaft in alinement with the driving shaft. Such an arrangement is shown diagrammatically in Figs. 2 and 3 of the drawings, the difference being that in Fig. 2, the two crank arms of the intermediate shaft which cooperate with the driving and driven shafts, respectively, are of equal length, whereas in Fig. 3, these two crank arms on the intermediate shaft are of unequal length.

Figure 2:
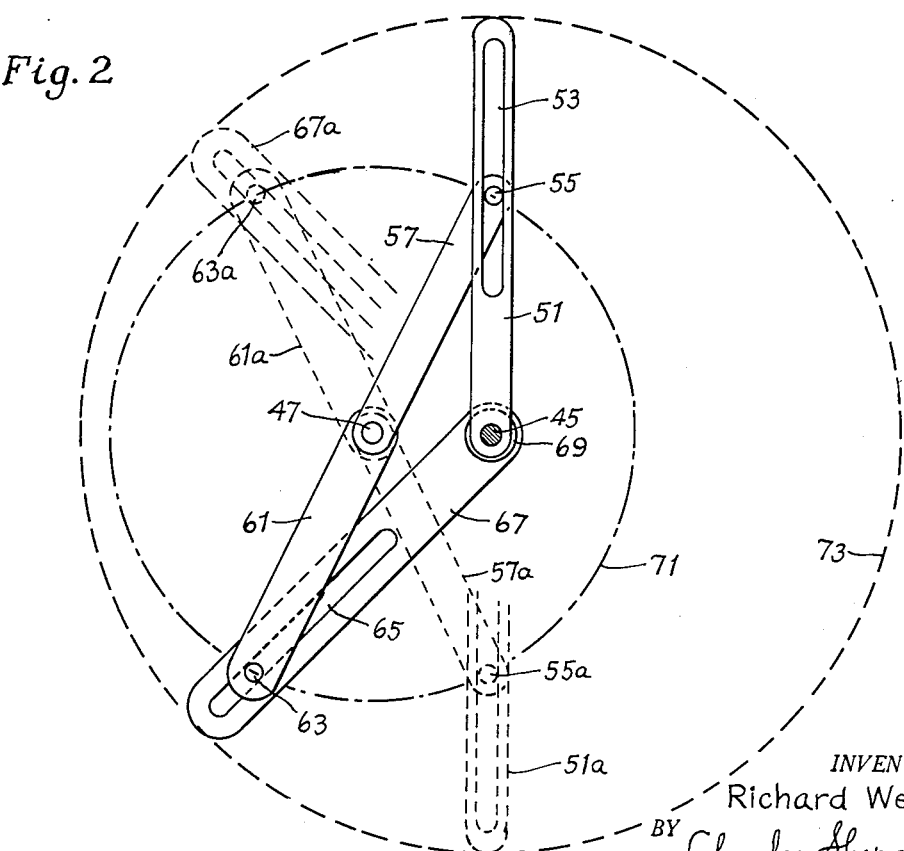
Fig. 2 is a similar view of another form of the invention, in which the driving shaft and the driven shaft may be in alinement with each other.

Referring first to Fig 2, the numeral 45 indicates the driving shaft in cross section. The driven shaft 69 is shown here as being of somewhat larger diameter than the shaft 45, simply because it is in exact axial alinement with the driving shaft and would be completely hidden by the driving shaft if it were not of larger diameter. The offset intermediate shaft is indicated at 47. The driving shaft 45 has fixed to it the slotted radial crank arm 51 provided with a slot 53 for receiving the pin 55 fixed on the crank arm 57 which is, in turn, fixed to the intermediate shaft 47. The crank arm 57 is, for example, at the near end of the intermediate shaft 47, when viewed as in Fig. 2. Intermediate the length of the shaft 47, it is supported by a suitable bearing. At the far end of the same shaft 47, is fixed a second rigid crank arm 61, preferably but not necessarily diametrically opposite to the position of the crank arm 57. At the outer end of this crank arm 61 is a fixed pin 63 which slides in a radial slot 65 of a radial crank arm 67 fixed to the driven shaft 69 which is connected to the film feeding sprocket.

In this construction, as above mentioned, the crank pins 55 and 63 are at equal distances from the intermediate shaft 47, and both of them swing around the circle indicated by the dotted lines 71. The two radial crank arms 51 and 67 on the driving shaft and driven shaft, respectively, are likewise of equal length, and their outer ends travel in a path indicated by the dotted circle 73.

Assuming the parts to be in the initial position shown in full lines in Fig. 2, now if the driving shaft 45 is turned clockwise through 180 degrees, the arm 51 thereon will swing around to the diametrically opposite position indicated by dotted lines at 51a. This will cause the crank pin 55 to swing around its circle 71 to the position indicated at 55a. This will, of course, turn the intermediate shaft 47 so that the other crank pin 63 thereon moves around to the position 63a, thus carrying the radial crank arm 67 to the position shown in dotted lines at 67a. This position 67a is 90 degrees from the full line position of the arm 67, so it is seen that when the driving shaft 45 and its crank 51 turn through 180 degrees, the driven shaft 69 and its crank 67 turn through 90 degrees.

Then if the driving shaft 45 is turned the next 180 degrees in a clockwise direction to its initial position, the driven shaft 69 will be carried around through 270 degrees, to its initial position. Hence successive half turns of the driving shaft 45 will cause alternate feeding movements of the film, first through one picture space or distance, then through three picture spaces or distances, then through one picture space again, etc.

Figure 3:
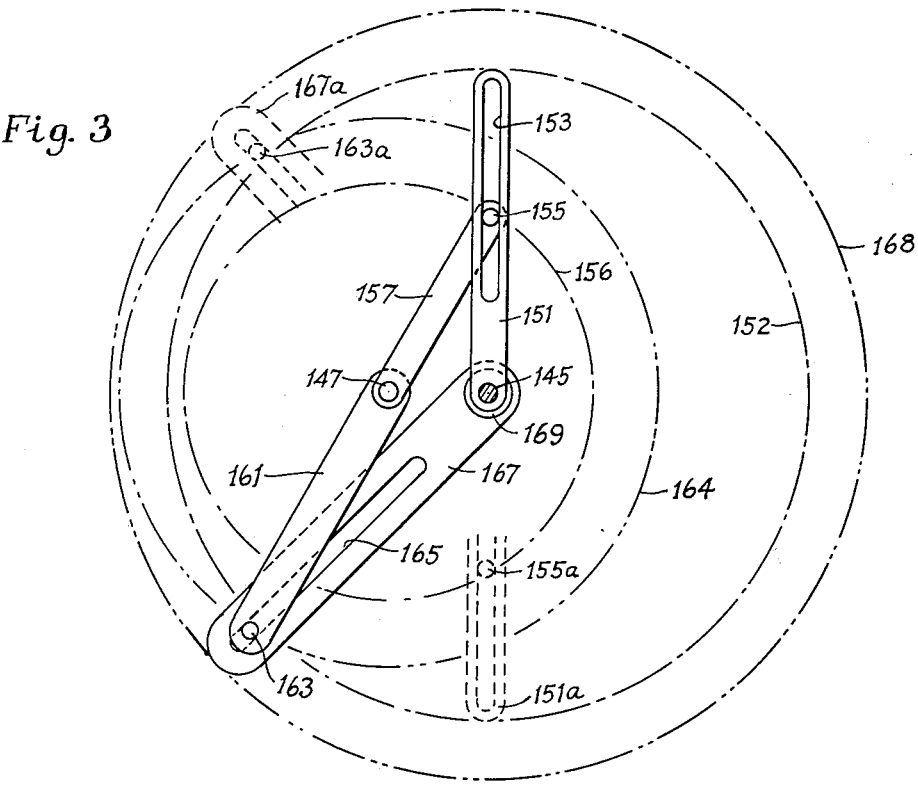
Fig. 3 is a view similar to Fig. 2 showing a slightly different arrangement, the crank pins of an intermediate shaft here being at unequal radial distances from the shaft, whereas in Fig. 2 they are at equal radial distances from the shaft.

As already indicated, it is not necessary that the crank arms 57 and 61 on the intermediate shaft be of equal lengths. They may be of unequal lengths, if desired, and this is illustrated in Fig. 3, where the corresponding parts bear the same reference numerals as in Fig. 2, except that 100 has been added to each numeral. Thus the driving shaft indicated at 45 in Fig. 2 is shown at 145 in Fig. 3, its radial crank arm is indicated at 151, cooperating with the pin 155 on the short crank arm 157 on the shaft 147, while the longer crank arm 161 of this shaft has a pin 163 cooperating with the longer crank arm 167 on the driven shaft 169. The path of movement of the end of the crank arm 151 is indicated by the circle 152, the path of movement of the end of the crank arm 167 on the driven shaft 169 is indicated by the circle 168, the path of movement of the crank pin 155 is indicated by the circle 156, and the path of movement of the crank pin 163 is indicated by the circle 164.

Figure 4:
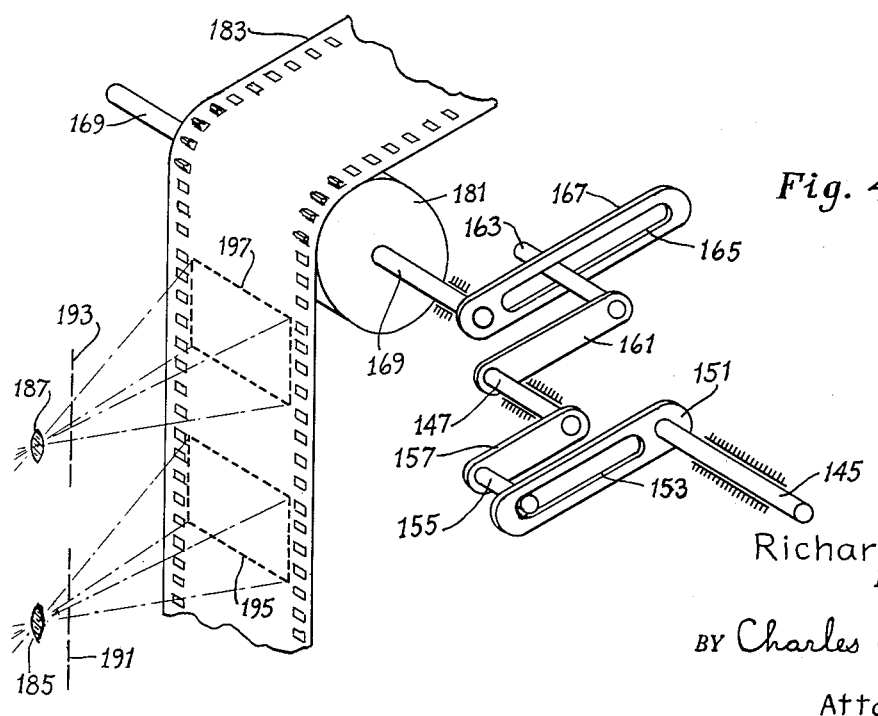
Fig. 4 is a diagrammatic perspective view of the arrangement shown in Fig. 3, showing additional details common to the constructions shown in all of the other figures.

The same structure, employing unequal crank arms on the intermediate shaft, is illustrated in diagrammatic perspective in Fig. 4, in which the parts bear the same reference numerals used for the same parts in Fig. 3. In addition, certain other parts of the photographic camera are shown in Fig. 4, such as the film feeding sprocket 181 mounted on the driven shaft 169 and serving to advance the film strip 183 by means of sprocket teeth on the member 181 engaging the usual perforations at the edges of the film strip.

The two lenses for taking the two stereoscopic exposures are indicated diagrammatically at 185 and 187, and the light beams through these lenses are controlled by shutters indicated diagrammatically at 191 and 193, respectively. When these shutters are simultaneously opened, light passing through the lens 185 makes an exposure on the picture area 195 of the film, while light passing through the lens 187 makes an exposure on the picture area 197 of the film. These picture areas 195 and 197, as will be noted, are not contiguous to each other but are separated from each other by one blank space or picture area between them. This same arrangement of lenses, shutters, and picture areas on the film applies also, of course, to the film advancing mechanism or feeding mechanism shown in Figs. 1, 2, and 5, as well as to the mechanism specifically shown in Figs. 3 and 4.

In operation, assuming that a fresh supply of film has been loaded into the camera and is in readiness for making the first exposure, and that the film advancing drive shaft 145 is in the position shown in Fig. 3, the operator operates the shutters 191 and 193 in the usual known manner so that the lenses 185 and 187 focus the light beams on the picture areas 195 and 197, respectively. Then the film feeding shaft 145 is turned in a clockwise direction through half a revolution or 180 degrees, by means of any suitable externally accessible knob or crank. The crank arm 151 fixed to this shaft causes the pin 155 on the arm 157 of the intermediate shaft 147 to travel around through somewhat less than 180 degrees but more than 90 degrees, from the position shown in full lines to the position shown in dotted lines at 155a in Fig. 3.

The turning of this intermediate shaft 147 through this extent causes a corresponding extent of movement of the other crank arm 161 mounted on the same intermediate shaft, thus swinging the pin 163 from the full line position to the dotted line position 163a of Fig. 3, causing a corresponding swinging of the arm 167 on the driven shaft 169 which controls the sprocket 181. This extent of movement of the arm 167 on the shaft 169, it will be noted, is a turn of 90 degrees, thereby advancing the film through the space of one picture area.

For the next exposure, the shutters 191 and 193 are again operated, whereby exposures are made on the new picture areas which are now opposite the lenses. Then the shaft 145 is again turned through one-half a revolution or 180 degrees, and this time, as above explained, the rotation of the shaft 145 through 180 degrees causes a rotation of the shaft 169 through 270 degrees advancing the film strip through the space of three picture areas, so that fresh unexposed film is brought opposite both of the lenses 185 and 187.

Figure 5:
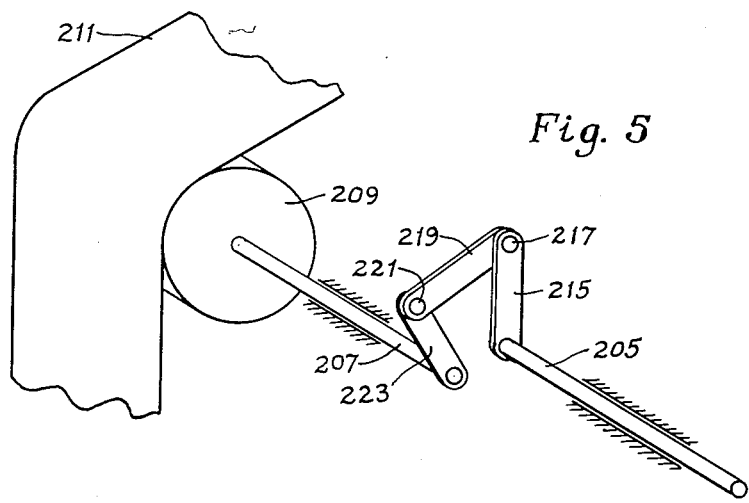
Fig. 5 is a diagrammatic perspective view of still another arrangement according to the present invention.

A further embodiment of the invention is illustrated in Fig. 5. Here, the driving shaft 205 is parallel to but offset from the driven shaft 207 which is connected to the film sprocket 209 to drive the film strip 211. The driving shaft 205 carries a crank arm 215, pivoted at 217 to a link 219, the other end of which is pivoted at 221 to the crank arm 223 fixed to the shaft 207. The length of the crank arms 215 and 223 and the length of the link 219 are so chosen with respect to the offset distance between the shafts 205 and 207, that during the first half of the revolution of the shaft 205, the shaft 207 is turned only through a quarter of a revolution, while during the next half of the revolution of the shaft 205, the shaft 207 is turned through three-quarters of a revolution. The other features of the camera and the use thereof are the same as already described in conjunction with Fig. 4.

Figure 6:
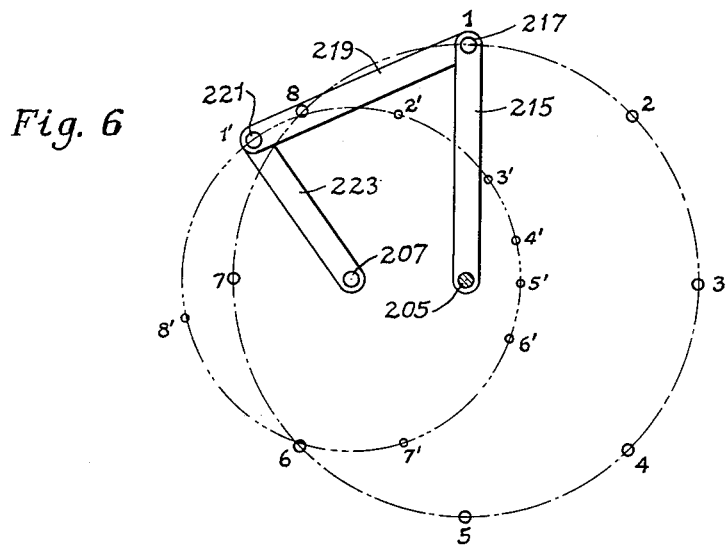
Fig. 6 is a diagrammatic elevational view of the arrangement shown in Fig. 5.

Fig. 6 shows this same embodiment illustrated in Fig. 5, in diagrammatic elevation similar to Figs. 1–3. It is seen that as the pivot pin 217 on the crank arm 215 moves around to the successive positions indicated from 1 to 8, inclusive, the other crank pin 221 on the crank arm 223 will assume the successive position indicated at 1' to 8', inclusive. It is also seen from this diagram in Fig. 6 that the desired relationship of rotation of the shaft 205 to rotation of the shaft 207 is achieved. As the shaft 205 turns through 180 degrees to carry the pin 217 from position 2 to position 6, the shaft 207 moves through only 90 degrees, moving the pin 221 from position 2' to position 6'. Then when the shaft 205 makes its next half revolution, from position 6 clockwise to position 2, the shaft 207 swings through 270 degrees to carry the pin 221 clockwise from position 6' to position 2'.

It will be seen from the foregoing disclosure that the above mentioned objects of the invention are well fulfilled. It is to be understood that the foregoing disclosure is given by way of illustrative example only, rather than by way of limitation, and that without departing from the invention the details may be varied within the scope of the appended claims.

What is claimed is:

1. A photographic camera including means for holding a film strip, lens and shutter means for making exposures simultaneously on two non-contiguous picture areas of the film strip spaced from each other by a distance substantially equal to the length, along the film strip, of one picture area, a film feed drive shaft, means for turning said drive shaft through a uniform aliquot part of a revolution each time that an exposure is made, a driven shaft operatively connected to the film to move it, said driven shaft and said drive shaft having their axes substantially parallel to each other and offset laterally from each other, and coupling mechanism for turning the driven shaft through one extent of angular motion when the drive shaft is turned through a given extent in one part of a complete rotation, to feed the film strip through one unit of distance, and turning the driven shaft through a substantially different extent of angular motion when the drive shaft is turned through the same given extent in a different part of a complete rotation to feed the film strip through a greater distance of feeding motion which is a multiple of the first mentioned distance, said coupling mechanism including a crank arm of one radial length on said drive shaft, a crank arm of a materially different radial length on said driven shaft, and means interconnecting the two crank arms to each other to drive said crank arm on said driven shaft from the rotary motion of the crank arm on said drive shaft.

2. A construction as defined in claim 1, in which said different extent of angular motion of the driven shaft is substantially three times the first mentioned extent of angular motion of the driven shaft.

3. A construction as defined in claim 1, in which a turning of said drive shaft through one half of a complete rotation turns said driven shaft through one quarter of a complete rotation, and a turning of said drive shaft through the other half of a complete rotation turns said driven shaft through three quarters of a complete rotation.

4. A construction as defined in claim 1, in which said coupling mechanism includes a substantially radial slot in at least one of said crank arms, and a crank pin engageable in and slidable radially along said slot.

5. A construction as defined in claim 4, in which only one of said crank arms has a substantially radial slot and in which said crank pin is mounted in fixed position on the other of said crank arms.

6. A photographic camera including means for holding a film strip, lens and shutter means for making exposures simultaneously on two non-contiguous picture areas of the film strip spaced from each other by a distance substantially equal to the length, along the film strip, of one picture area, a film feed drive shaft, a driven shaft operatively connected to the film to move it, and coupling mechanism for turning the driven shaft to one extent of angular motion when the drive shaft is turned through a given extent in one part of a complete rotation and turning the driven shaft through a substantially different extent of angular motion when the drive shaft is turned through the same extent in a different part of a complete rotation, said coupling mechanism including a crank arm on said drive shaft, a crank arm on said driven shaft, said crank arms on both the drive shaft and the driven shaft having substantially radial slots, an intermediate shaft offset from both said drive shaft and said driven shaft, and two crank arms on said intermediate shaft, one having a pin engaging a slot in the crank arm of the drive shaft and the other having a pin engaging a slot in the crank arm of the driven shaft.

7. A construction as defined in claim 1, in which said coupling mechanism includes a link pivotally connected to both of said crank arms at respective pivot points of the two crank arms at different radial distances from their respective shafts.

References Cited in the file of this patent

UNITED STATES PATENTS

| 1,480,864 | Reed | Jan. 15, 1924 |
| 2,475,622 | Kuehn | July 12, 1949 |

FOREIGN PATENTS

| 831,473 | France | June 7, 1938 |